United States Patent Office 3,414,500
Patented Dec. 3, 1968

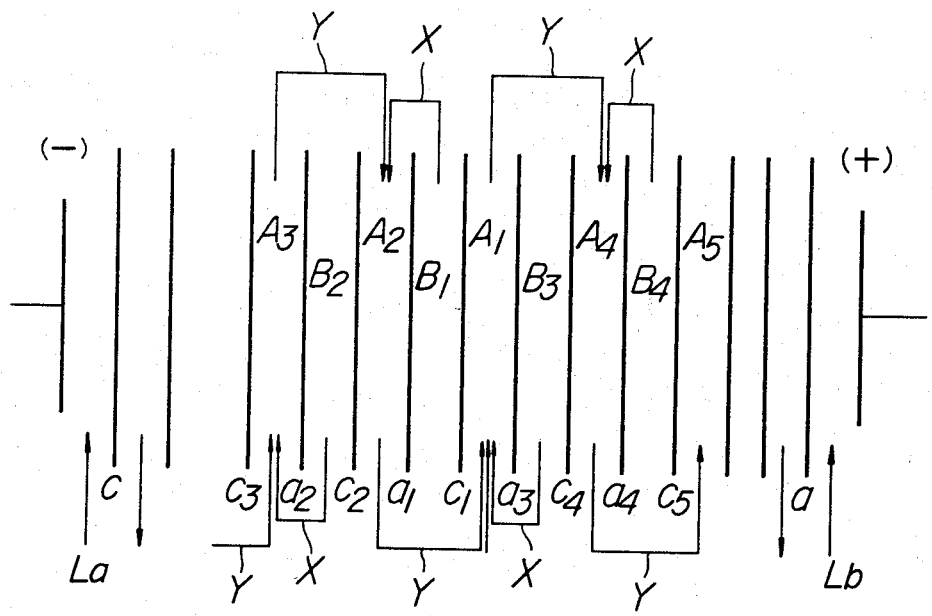

3,414,500
METHOD FOR SEPARATING ISOTOPES
Hidetake Kakihana and Maomi Seko, Tokyo, Japan, assignors to Asahi Kasei Kogyo Kabushiki Kaisha, Osaka, Japan, a corporation of Japan, and Hidetake Kakihana, Tokyo, Japan, as joint owners
Filed July 27, 1964, Ser. No. 385,298
Claims priority, application Japan, Aug. 2, 1963, 38/40,311
16 Claims. (Cl. 204—180)

ABSTRACT OF THE DISCLOSURE

A method of obtaining isotopes in the ion state utilizing an electrodialysis apparatus consisting of a plurality of cation permselective membranes and anion permselective membranes alternately arranged between an anode and a cathode, which comprises feeding an electrolyte solution containing isotopes to be separated in the ion state into a compartment which is constituted by the cation permselective membrane on the cathode side and the anion permselective membrane on the anode side, passing a direct electric current through the apparatus whereby the isotopic ions to be separated migrate selectively through membranes of the same charge into the adjacent compartments, refluxing the solution from the compartment successively into every other compartment in a direction opposite to that of the electromigration of isotopes, and obtaining lighter istope ions in the compartment near the electrode in the direction of electromigration and heavier isotopes in the compartment near the electrode in a direction opposite to that of the electromigration.

---

This invention relates to a method for separating isotopes existing in an ion state in an electrolyte solution by use of cation permselective resin membranes and anion permselective resin membranes alternately arranged in an electrodialysis apparatus, while passing D.C. current through this cell. More precisely this invention relates to a method for separating isotopes except those of rare gas elements, especially isotopes of uranium, lithium, calcium, boron, deuterium, nitrogen, chlorine and carbon by utilizing a multi-cell electrodialysis cell, consisting of a plurality of concentrating compartments and desalting compartments formed therein alternately in series between a pair of electrodes.

For the separation and enrichment of isotopes, several physical methods such as gas diffusion method, centrifugal separation method or the like have been known. However, all of these methods require equipment of extremely large size and a large capital outlay which inevitably makes the products very expensive. There have been also known heretofore some chemical methods for separating isotopes. For example, methods which separate isotopes by electromigration in aqueous solution have been proposed by A. K. Brewer, S. L. Mardrosky [J. Research Nat. Bur. Standards 38, 137 (1947)], S. L. Mardrosky and S. Straus [ibid., 38, 185 (1947)], etc. However, these methods are not effective because the migration of isotopic ions was disturbed by the migration of counter ions traveling in the opposite direction against the isotopic ions. Furthermore, due to the hydration of ions during the migration, the effect of the separation caused by the difference in mass of the isotopes is reduced. Accordingly, both the separation and enrichment of isotopes on a commercial scale are impossible in these methods.

There has also been known another method proposed by A. Klem and A. Neubert [Zeitschrift fur Naturforschung 16a 685 (1961)]. In this method, fused salt is used for the separation and the enrichment of isotopes to remove the solvation or hydration effect, but this method also has great difficulties due to the employment of fused salt at high temperature. Still another known electromigration method employs granular ion exchange resins packed in a column for separating and enriching isotopes. In this method, istopic ions to be separated are adsorbed by the resins from the liquid through an ion exchange reaction and subsequently migrate in the resins by electricity.

However the separation efficiency of isotopes by this method is poor.

An object of the present invention is accordingly to provide a method for the separation of isotopes which completely eliminates the above-mentioned disadvantages encountered in all of the conventional methods.

Another object of the present invention is to provide a method which enables separation of isotopes continuously and economically on a commercial scale of operation.

These and other objects are attained by the present invention.

According to the present invention, an electrodialysis apparatus is used in which cation exchange resin membranes and anion exchange resin membranes are alternately arranged in the apparatus between a cathode and an anode to form a plurality of alternate concentrating compartments and desalting compartments therebetween, and an electrolyte containing isotopic ions of one kind of element is fed to a particular desalting compartment defined by a cation exchange resin membrane on the cathode side and with an anion exchange membrane on the anode side, and by passing D.C. current, lighter isotopic ions to be separated in the above-mentioned compartment are more selectively forced to migrate through the ion exchange resin membrane to the adjacent compartment, and the solution thus obtained by passing through the exchange membrane is further fed to the adjacent compartment situated in the direction of migration of the said isotopic ions to be separated and the said procedure is repeated in the cell thereby to effect the desired separation in the final state.

In order that this invention may be more readily understood reference will now be made to the accompanying drawing which represents in the sole figure thereof the process of separation by means of a schematic diagrammatic view of the apparatus used in the present invention. According to the drawing a plurality of cation permselective resin membranes $C_1$, $C_2$, $C_3$, $C_4$, $C_5$ . . . and anion permselective resin membranes $a_1$, $a_2$, $a_3$, $a_4$, $a_5$ are arranged alternately with a small intermembrane distance therebetween so as to define desalting compartments $A_1$, $A_2$, $A_3$, $A_4$, $A_5$ . . . and concentrating compartments $B_1$, $B_2$, $B_3$, $B_4$ . . . alternately in the electrodialysis apparatus. When an electrolyte solution containing isotopic cation is fed to a particular desalting compartment e.g. $A_1$ and D.C. current is passed through the cell, the lighter isotopic ions pass the cation permselective resin membranes (referred to as $Ca$ membrane hereafter) selectively by the difference of their masses even when the ions are dissociated from the same compound. In general, the lighter isotopic cations (or anions) more easily pass the cation (or anion) permselective membranes than the heavier isotopic ions.

Tracing now the course of cations, when the electrolyte solution containing the lighter isotopic cations is fed to the desalting compartment $A_1$, isotopic cations pass the $Ca$ membrane $C_1$ and migrate faster than the heavier isotopic cations toward the adjacent concentrating compartment $B_1$ on the cathode side of said desalting compartment, i.e. on the left side of $A_1$ in the drawing. Since the resin membrane on the cathode side of this chamber $B_1$ is an anion permselective resin membrane (referred to as *an* membrane hereafter), $a_1$, isotopic cations are not transported further toward the cathode side in this chamber, and the lighter isotopic cations are separated from heavier isotopic cations and enriched in this compartment.

When the solution in which the lighter isotopic cations are separated from the heavier isotopic cations and thus concentrated in concentrating compartment $B_1$ is fed through a piping X to an adjacent desalting chamber $A_2$ on the cathode side of $B_1$ to effect a further separation, the lighter isotopic cations pass $Ca$, membrane $C_2$, and migrate toward a concentrating compartment $B_2$ on the cathode side and therefore are to be selectively separated from heavier isotopic cations of $A_2$ in this compartment as in the foregoing concentrating compartment $B_1$. The solution in concentrating compartment $B_2$ is then fed through the piping X toward the cathode side into the desalting compartment $A_3$ to effect a still further separation through the $Ca$ membranes. Since the lighter isotopic cations are selectively separated and migrate toward the cathode side concentrating compartment by electric current while the electrolyte solution is fed to the desalting compartments and flow therein the concentration of lighter isotopic cation is reduced in the neighborhood of the outlets of the desalting compartments. Accordingly the outlet solution of a desalting compartment is returned through a piping Y toward the anode side into another desalting chamber in such a way that the outlet solution of the desalting compartment $A_3$ is returned to the desalting compartment $A_2$ the outlet solution of $A_1$ to $A_4$, $A_4$ to $A_5$ to effect further separation.

By repeating the above-mentioned procedure, the lighter isotopic cation existing in the electrolyte solution fed to the desalting compartments of the cell, is effectively separated from the heavier isotopic cations and enriched in the concentrating compartment situated at the position nearest to the cathode and withdrawn therefrom, while the heavier isotopic cation is concentrated and withdrawn from the concentrating compartment situated at the position nearest to the anode.

In the drawing $La$ is the cathode solution and $Lb$ is the anode solution.

For separating isotopic anions, the electrolyte solution is fed to the desalting compartment $A_1$ and lighter isotopic anions pass through the *an* membrane more easily than heavier isotopic anions, thus being separated from heavier ions and concentrated in the concentrating compartments B. The solution in which the concentration of lighter isotopic ions is greater than that of heavier ions in B is returned through the pipe X toward the anode side into the desalting compartments in such a way that the solution in $B_2$ is fed to $A_2$, $B_1$ to $A_1$, $B_3$ to $A_4$, $B_4$ to $A_5$ to effect further separation. The outlet solution of desalting compartments $A_5$, $A_4$, $A_1$, $A_2$ is returned through the pipe Y toward the cathode side into the desalting compartments $A_4$, $A_1$, $A_2$ and $A_3$ respectively to effect further separation.

Though the foregoing description relates to a process in which the separation and enrichment of cation and anion are carried out in one system separately, it is also possible to arrange the feed and the return of solutions in each compartment in such a way as to effect the separation of lighter isotopic cations in concentrating the compartments on the cathode side and the separation of lighter isotopic anions in chambers on the anode side in one system.

In the separating of isotopes by the above-mentioned process, the solution fed to the desalting compartments A is diluted while the solution fed to the concentrating compartments B is concentrated.

Hence it is sometimes advantageous to carry out only the separation effect of isotopic ions by adding water to the concentrating chamber nearest to the cathode, due to the concentration of solution thereby to lower the concentration effect of the solution.

It is also sometimes advantageous to effect pH control in each compartment and also ordinary chemical reactions such as oxidation and reduction of the solution during the course of feed and return via piping X and Y. Here pipe X is used in transporting the solution of a certain compartment to the adjacent compartment while Y to every other compartment of lighter ion through membranes.

The ease with which lighter ions pass through the permselective membrane, i.e. selective permeability is represented, in general, as the quotient of the ratio of the amounts of isotopic ions between lighter and heavier isotopic ions which pass through the membrane versus their ratio in the solution. It is dependent upon such factors as the physicochemical construction of resin membranes, exchange capacity, conductivity, current intensity, current density, concentration of the solution in each compartment and flow rate of solution. In general the better the condition of flow, and the longer the migration distance in the membrane, in comparison with the concentration of the solution, the greater the selectivity of lighter isotopic ion.

The ratio of return (reflux), the amount of flow of solution, current and the like in the separation of isotopic ions in a cascade system of the above-mentioned separation system can be calculated, as in the ordinary cascade separation system, from separation grade of isotopes, raw material composition, and separating coefficient of one pass through the resin membrane.

The conventional electrodialysis unit is constructed by assembling a plurality of cation permselective resin membranes and anion permselective resin membranes alternately. It is advantageous to arrange an electrodialysis cell such that a plurality of said electrodialysis unit consisting of some tens or hundreds of pairs of membranes are arranged between a pair of electrodes thereby to enable adjustment in the composition of feed and returning solution, assembling and disassembling of the cell on an industrial scale and the effective separation by cascade system.

D.C. current density which does not cause polarization in each compartment is passed. When polarization occurs in each desalting compartment, increase in voltage and/or pH change may take place, frequently yielding insoluble precipitation. Accordingly agitation of the solution on the surface of the membranes is effected to advantage to prevent polarization and pH change of solution in each compartment. In general, the limit of current density which allows the electrodialysis without polarization is in the range of $i/c = 50 \sim 2,000$, though dependent upon the construction of cell, where $c$ is a mean equivalent concentration of solution in the desalting compartment and $i$ ma./cm.$^2$ is the current density. It is also effective for preventing polarization to reverse the polarity periodically at a fixed interval of time during electrodialysis or instantaneously, or to superimpose A.C. current to flow counter concurrently. It is also possible to us an electrodialysis cell in which porous coarse fabrics or thin perforated plates exist in each compartment or paths of solution in each compartment are formed by narrow, long, and curved paths, i.e., a tortuous path.

The feeding and the returning (or refluxing) of the solution into or out of the compartments or between compartments is conveniently affected by using the conduits which are formed by cutting away a plurality of holes in the membranes and gaskets at the corresponding positions, which gaskets form the four peripheral parts of each compartment, and by assembling said membranes and gaskets to form conduits at their peripheral parts between electrodes. The cation permselective membranes and anion permselective membranes in the present invention consist of cation exchange resin and anion exchange resin respectively.

The cation exchange resin in the present invention is selected from homogeneous or non-homogeneous ion exchange resins having radicals of sulfonic acid, carboxylic acid, phosphoric acid or hydroxyl radicals. The anion exchange resins are selected from homogeneous or non-homogeneous ion exchange resins having amino or quaternary ammonium radicals.

The matrix of the resin is preferably selected from polymeric resins of monovinyl compounds such as styrene and divinyl e.g. divinyl benzene, and into the basic polymer is introduced a sulfonic acid radical, an amino radical, a quaternary ammonium radical or a phosphoric acid radical. The ion exchange resin material may be selected from copolymers of monovinyl compounds having a sulfonic acid radical or its substituted radical, a carboxylic acid radical or its substituted radical or a divinyl compound.

The ion exchange resin material may also be produced by condensation of an aromatic compound having a sulfonic radical, an amino radical or an aldehyde.

A resin material suitable for the process has an ion exchange capacity of more than 0.1 milliequivalent per 1 gram equivalent of dry resin.

Before being assembled into the migration equipment, the ion exchange group of the resin material may be converted to the type of ion of a neutral salt, or an acid or alkaline type. Rods, tubes or any other shape of ion exchange resin besides membrane can be used in the present invention so long as they can be constructed into the electrodialysis cell.

Further it is desirous that the transport number of the ion exchange resin membrane be as high as possible. If the transportation of counter ions occurs, the effectiveness of the present invention is much reduced. The electrolyte solution used in the present invention may be such a kind as to increase the coefficient of selective absorption of isotopic ions to the membranes. For example, in separating $^6$Li and $^7$Li of lithium, the hydroxide solution is more advantageously used than the chloride solution. Thus the sort of counter ions and the pH of the solution should be carefully selected as the selectivity of ions is lowered by the counter ions. Further in the system in which the election exchange between different kinds of isotopic ions occurs in the membranes or in the solution the ratio of amount between different isotopic ions existing in the higher oxidation state varies from that in the lower oxidation state according to the separation coefficient to produce frequently the effect on the direction of migration of ions carried by electric current. Accordingly it is desirous to make the most of this on the separation of isotopes. For example in the concentration of $U^{235}$ from a solution mixture of $U^{235}$ and $U^{238}$, when tetravalent uranium coexists with hexavalent uranium, the equilibrium of

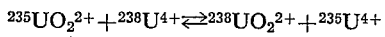
$$^{235}UO_2^{2+} + {}^{238}U^{4+} \rightleftharpoons {}^{238}UO_2^{2+} + {}^{235}U^{4+}$$

is established.

If the oxidation condition and pH condition of the reaction etc. are suitable to change the equilibrium, its shifts toward the right in the acidic solution, while $^{235}U$ exists more abundantly in $U^{4+}$ ion or in $U^{4+}$ attached by anions and $^{238}U$ exists abundantly in, $UO_2^{2+}$ or in $UO_2^{2+}$ ion attached by anions. Accordingly the utilization of oxidation and reduction system in the separation of $U^{235}$ provides an effective means in such a manner as to maintain the degree of oxidation for making the ratio of $UO_2^{2+} + U^{4+}$ suitable.

For maintaining the acidity at an effective value, both inoragnic and organic acids in the range of from 0.001 to 10 normal are useful. Sulfuric acid and hydrochloric acid are used to advantage.

The effective separation of isotopes in the ion state is made by causing isotope equilibrium in the oxidation and reduction system, which is applicable to all elements besides uranium. Inorganic or organic oxidizing agents such as air, oxygen hydrogen peroxide, chlorine or the like are used and the utilization of oxidation and reduction system can be performed simply in the course of solution feed or solution reflux from or to each chamber.

Though the foregoing explanation is intended for separating isotopic cations, it is naturally possible to separate isotopic anions in very much the same way by changing the direction of solution feed and reflux to that anion migration.

A more comprehensive understanding of the invention can be obtained by referring to the following illustrative examples which are not intended, however, to be unduly limitative of the invention.

EXAMPLE 1

An electrodialysis cell consisting of cathode chamber, intermediate compartment (desalting compartment) and anode compartment was constructed by arranging a cathode, a sheet of cation permselective resin membrane, a sheet of anion permselective resin membrane and an anode, in this order, the cation exchange resin membrane being of sulfonic acid type, made of styrene-divinyl benzene copolymer, having an effective area of 1 m.$^2$ and thickness of 0.3 mm. and the anion exchange resin membrane being of quatenary ammonium type, made of the same material and having the same dimensions. In the intermediate compartment, 100 l. of 0.05 normal sulfuric acid solution containing 0.5 normal uranyl sulfate and 0.5 normal uranous sulfate (the concentration of U$^{235}$ in total uranium was 0.7185 percent by weight) was circulated. 0.5 normal sulfuric acid solution was circulated in the cathode compartment, and 0.5 normal sodium sulfate solution in the anode compartment.

When the electrodialysis was continued by passing a D.C. current of 120 amperes, the uranium concentration in the intermediate compartment was reduced simultaneously with the supply of electric current while the concentration of uranium in the cathode compartment was increased by 295 g. per hour, sulfate ions were transported into the anode compartment by migration. The ratio of $^{235}U$ in uranium existing in the cathode compartment became greater.

By analysing the uranium transported to the cathode side with a mass analyser to divide U$^{238}$ and U$^{235}$ it was found that the mean content of $^{235}U$ in total uranium during the electrodialysis in the first 30 minutes after passing the electricity was 0.723 percent and the content of U$^{235}$ in total uranium was 0.726 percent according to the analytical result obtained after elapse of 9.5 hours from the start of current supply.

EXAMPLE 2

In the same apparatus as used in Example 2, the 1 normal solution of uranyl sulfate was circulated into said intermediate compartment and the same operation was carried out as in Example 1. The mean concentration of $^{235}U$ in total uranium obtained from the cathode compartment during the first 30 minutes after passing the electricity was 0.721 percent by weight and the concentration of $^{235}U$ in total uranium obtained from the cathode compartment after the elapse of 9.5 hours from the start of the operation was 0.723 percent by weight.

EXAMPLE 3

A multi-cell electrodialysis apparatus was constructed by alternately arranging 701 pairs of cation permselective resin membranes and anion permselective resin membranes with the intermembrane space of 1 mm. between a pair of electrodes to form alternate desalting and concentrating compartments, said cation permselective resin membranes being the same as those used in Example 1. To the intermediate compartment (desalting compartment) which was constructed of said cation exchange membrane on the cathode side, anion exchange membrane on the anode side and corresponding to the 350th pair counting from the cathode, 0.05 normal sulfuric acid solution containing 0.25 normal uranyl sulfate and 0.25 normal uranous sulfate (the concentration of $^{235}$U per total uranium being 0.7185 percent) was fed while the total cell was operated to form the cascade system as shown in the FIG. 1, the electric current being passed at 120 amperes. After the stationary state was established, the solution which contained 1.00 percent of $^{235}$U was discharged from the concentrating compartment nearest to the cathode which was constructed of cation exchange membrane, membrane on the anode side, and the solution which contained 0.437 percent of $U^{235}$ from the chamber nearest to the anode which was constructed of cation exchange resin membrane on the cathode side. In order to prevent the increase in the concentration of the solution existing in the concentrating compartment constructed of anion exchange membrane on the cathode side and cation exchange membrane on the anode side at this cascade operation, 35 l. of water was added to the concentrating compartment nearest to the cathode every hour thereby to maintain the mean concentration of uranium in the concentrating compartment at 0.5 normal. On the other hand in each transferring line from concentrating compartment to the adjacent desalting exchange resin compartment on the cathode side of said concentrating compartment, the solution was oxidized by air to maintain the amounts of four valent and six valent uranium existing in the solution almost at the same value.

EXAMPLE 4

A multi-cell electrodialysis apparatus was constructed of 701 sheets of sulfonated cation permselective resin membranes made of styrene-divinyl benzene copolymer and 700 sheets of anion permselective resin membranes which was made by chloromethylation and amination of styrene-divinyl benzene copolymer, both having effective area of 1 m.$^2$ and a thickness of 0.3 mm. by alternately arranging them in the order of the cathode compartment, cation membrane, anion membrane, . . . anion membrane and the anode compartment.

The 0.1 normal lithium hydroxide solution was fed to the 350th desalting compartment counting from the cathode, which was constructed of a cation exchange resin membrane on the cathode side and an anion exchange resin membrane on the anode side, making each compartment of the whole apparatus into the cascade system as shown in the figure. The operation was started by passing 110 amperes of current. The amount of $^6$Li in lithium hydroxide solution originally fed to the said compartment was 7.52 percent by weight per total lithium.

After a stationary state was established, the solution containing 8.25% of $^6$Li by weight per total lithium was obtained from the concentrating compartment nearest to the cathode, constructed of cation exchange resin membrane on the anode side, and the solution containing 6.82 percent of $^6$Li by weight per total lithium was obtained from the desalting compartment nearest to the anode constructed of cation exchange resin membrane on the cathode side. In this cascade operation also, the water was added to the concentrating compartment nearest to the cathode to maintain the concentration of lithium at 0.1 normal, as in Example 3. The substantially similar operation was carried out when the LiCl solution was fed at the same condition as lithium hydrate solution described above. The solution containing 8.05 percent of $^6$Li was obtained from the concentrating compartment nearest to the cathode and the solution containing 7.00 percent of $^6$Li from the concentrating compartment nearest to the anode by reversing the direction of feed and reflux of solution.

What is claimed is:
1. A method of obtaining isotopes in ion state by using an electrodialysis apparatus consisting of a plurality of cation permselective membranes and anion permselective membranes alternately arranged between an anode and a cathode to form a plurality of alternate desalting and concentrating compartments, said method comprising, feeding an electrolyte solution which contains isotopes of the same element to be separated in the ion state into the compartments of said apparatus each of which compartments is constituted by said cation permselective membrane on the cathode side and said anion permselective membrane on the anode side, passing direct electric current through said apparatus whereby the isotopic ions to be separated selectively migrate through said membranes of the same sign into the adjacent compartments, obtaining isotopic ions having smaller mass from a compartment in the direction of electromigration of the isotopic ion and obtaining isotopic ions having larger mass from a compartment in the opposite direction of electromigration of the isotopic ion.

2. A method as claimed in claim 1 which comprises feeding the solution in which the lighter isotopic ions are concentrated after selectively passing through said membranes which selectively pass the ions of the same sign as that of said isotopic ions to the adjacent compartments in the same direction as that of the migration of said isotopic ions thereby to effect further migration and separation through said membranes which pass the ions of the same sign as that of said isotopic ions, and refluxing the solution discharged from said desalting compartment in which the concentration of the isotopic ions is smaller than that before migration into the subsequent desalting compartments in a direction opposite to that of said isotopic ions for the migration and separation.

3. A method for separating isotopes in ion state using an electrodialysis apparatus consisting of a plurality of cation permselective membranes and anion permselective membranes alternately arranged between an anode and a cathodes to form a plurality of alternate desalting and concentrating compartments, said method comprising feeding an electrolyte solution which contains isotopes of the same element to be separated in ion state into the desalting compartments of said apparatus each of which compartments is constituted by said cation permselective membranes on the cathode side and said anion permselective membrane on the anode side, passing direct electric current through said apparatus whereby the isotopic ions to be separated migrate through said membranes which pass the ions of the same sign as that of said isotopic ions into the adjacent compartments, obtaining isotopic ions having smaller mass from a compartment in the direction of electromigration of the isotopic ion and obtaining isotopic ions having larger mass from a compartment in the opposite direction of electromigration of the isotopic ion.

4. A method as claimed in claim 3 which comprises feeding the outlet solution of said desalting compartments, in which said isotopic ions have been separated and concentrated after passing through said membranes, to the adjacent compartments in the same direction as that of migration of said isotopic ions thereby to effect further migration and separation through said membranes, a refluxing the outlet solution in which the concentration of lighter isotopic ions is smaller than that before migration, into the subsequent desalting compartment in the opposite direction of migration of said isotopic ions to effect further migration and separation, and obtaining solutions in which the respective isotopic ions are separated and concentrated from the concentrating compartments nearest to the electrodes.

5. A method as claimed in claim 3 which comprises feeding a third electrolyte solution unrelated to the isotopes to be separated into the desalting compartments each of which compartments is constructed of cation permselective membrane on the cathode side and anion permselective membrane on the anode side, and returning the solution in the said desalting compartments to every other desalting compartment for obtaining the isotopic ions having smaller mass from a compartment in the direction of electromigration of isotopic ion and obtaining the isotopic ions having larger mass from a compartment in the opposite direction of electromigration of the isotopic ion.

6. A method as claimed in claim 3 which comprises separating and concentrating said isotopic cations in the compartments on the cathode side and said isotopic anions in the compartments on the anode side whereby the isotopic cations and anions are separated and concentrated in the same apparatus.

7. A method as claimed in claim 3 which comprises oxidizing the electrolyte solution fed to said compartments to shift the oxidation reduction equilibrium between different isotopic ions.

8. A method as claimed in claim 3 wherein $^{235}U$ is separated from $^{238}U$ and enriched.

9. A method as claimed in claim 3 wherein $^6Li$ is separated from $^7Li$ and enriched.

10. A method of separating isotopic ions by electromigration in a cell consisting of a plurality of cation exchange membranes and anion exchange membranes alternately arranged between an anode and a cathode to define alternate concentrating and desalting compartments, said method comprising feeding an electrolyte solution which contains isotopic ions to be separated to one of the desalting compartments, successively migrating the isotopic ions from the desalting compartment to the adjacent concentration compartment, the effluent from the concentration compartment being supplied to the adjacent desalting compartment in the direction of electromigration, the lighter isotopic ion being thereby separated from the compartment in the direction of electromigration of isotopic ions, the heavier isotopic ion being separated from a compartment in a direction opposite that of electromigration.

11. A method as claimed in claim 10 which comprises feeding the outlet solution of said desalting compartments, in which said isotopic ions have been separated and concentrated after passing through said membranes, to the adjacent compartments in the same direction as that of migration of said isotopic ions thereby to effect further migration and separation through said membranes, refluxing the outlet solution in which the concentration of lighter isotopic ions is smaller than that before migration, into the subsequent and alternate desalting compartment in the opposite direction of migration of said isotopic ions to effect further migration and separation, and obtaining solutions in which the respective isotopic ions are separated and concentrated from the concentrating compartments nearest to the electrodes.

12. A method as claimed in claim 10 which comprises feeding a third electrolyte solution unrelated to the isotopes to be separated into the desalting compartments each of which compartments is constructed of cation permselective membrane on the cathode side and anion permselective membrane on the anode side, and returning the solution in the said desalting compartments to every other desalting compartment for obtaining the isotopic ions having smaller mass from a compartment in the direction of electromigration of isotopic ion and obtaining the isotopic ions having larger mass from a compartment in the opposite direction of electromigration of the isotopic ion.

13. A method as claimed in claim 10 which comprises separating and concentrating said isotopic cations in the compartments on the cathode side and said isotopic anions in the compartments on the anode side whereby the isotopic cations and anions are separated and concentrated in the same apparatus.

14. A method as claimed in claim 10 which comprises oxidizing the electrolyte solution fed to said compartments to shift the oxidation reduction equilibrium between different isotopic ions.

15. A method as claimed in claim 10 wherein $^{235}U$ is separated from $^{238}U$ and enriched.

16. A method as claimed in claim 10 wherein $^6Li$ is separated from $^7Li$ and enriched.

References Cited

UNITED STATES PATENTS 2,741,591            Dewey et al.

JOHN H. MACK, *Primary Examiner.*

A. C. PRESCOTT, *Assistant Examiner.*